July 8, 1958 R. PINTARELLI 2,842,337
VALVE CONTROLS
Filed Jan. 17, 1955

INVENTOR.
Ralph Pintarelli
BY
Elliot A. Salter

United States Patent Office 2,842,337
Patented July 8, 1958

2,842,337

VALVE CONTROLS

Ralph Pintarelli, Johnston, R. I.

Application January 17, 1955, Serial No. 482,204

1 Claim. (Cl. 251—339)

This invention relates generally to valve construction and more specifically to improved means for actuating valves used in fluid lines.

A primary object of this invention is the provision of novel valve control means which will eliminate freezing of exposed water pipes during winter weather.

In accordance with the above, an object of my invention is the provision of novel valve control means wherein the valve is located considerably remote from the controls thereof.

Another object is the provision of valve control means which are readily adjustable to vary the extent of movement of the valve element from its seat whereby a desired rate of flow may be attained.

Still another object of my invention is the provision of valve control means which are particularly adaptable where it is desired to discharge water or the like through a plurality of orifices simultaneously, such as for various types of irrigation.

A further object is the provision of valve control means which eliminate the necessity of utilizing handles such as are commonly employed at home water connections for garden hose and the like.

Still a further object is the provision of a valve normally biased to closed position but which will automatically be opened when a standard hose coupling or the like is coupled to an end of the tubing containing the valve.

Another object is the provision of a specially designed tool for actuating the valve.

Still another object is the provision of valve control structure which is efficient and reliable in operation, simple and economically feasible to manufacture, and durable of construction.

Other objects, features and advantages of the invention will become apparent as the description thereof proceeds when considered in connection with the accompanying illustrative drawings.

In the drawings which illustrate the best mode presently contemplated by me for carrying out my invention:

It has long been the established practice for homes, apartments, etc., to have outside water connections to which garden hose and the like may be attached. Generally, these outside connections comprise a length of tubing extending from within to a point somewhat outside the house or apartment and terminating in a coupling to which a hose or the like may be attached. A cut-off valve is usually located near the outer extremity of the tubing and is actuated by a handle element, ordinarily of the detachable variety. There are two main disadvantages to the above-discussed arrangement, namely, as follows: First of all, since a substantial portion of tubing extends outside the house or apartment, and since the valve is located near the outer extremity thereof, freezing of the water in the exposed portion of the pipe leading up to the valve frequently occurs during winter weather. The disadvantages emanating from this occurrence are too numerous to mention. Secondly, the detachable handle for turning the water on and off is constantly becoming lost or misplaced, or else removed or tampered with by mischievous children. Both of these disadvantages are overcome by the novel valve control means of this invention, now to be described.

Figure 1:
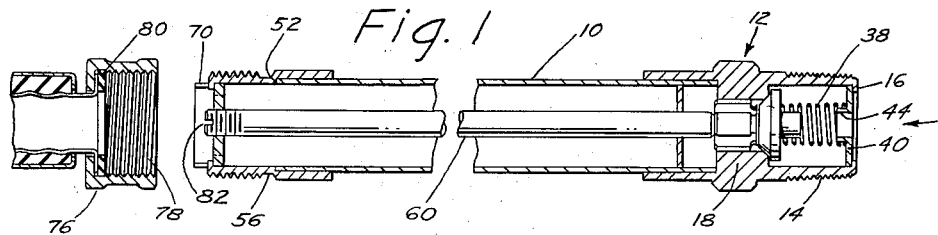
Fig. 1 is a side elevation, partly in section, of my improved valve control assembly with the valve in closed position.

Referring now to the drawings, and more particularly to Fig. 1 thereof, my improved valve control assembly comprises a length of tubing or pipe 10, which may be of any metallic material although copper is preferred. Secured to one end of tube 10, as by soldering or the like, is a substantially cylindrical valve coupling, generally designated at 12. Coupling 12 is externally threaded as at 14 and has an inwardly extending peripheral flange 16. Equally spaced around the periphery of flange 16 are four notches 17, note Fig. 3, the purpose of which will hereinafter become apparent. Coupling 12 further has a centrally disposed, peripheral constricted portion 18 which provides a shoulder against which the end of tube 10 abuts and which further provides a valve seat for valve assembly 20.

Figures 3, 4:
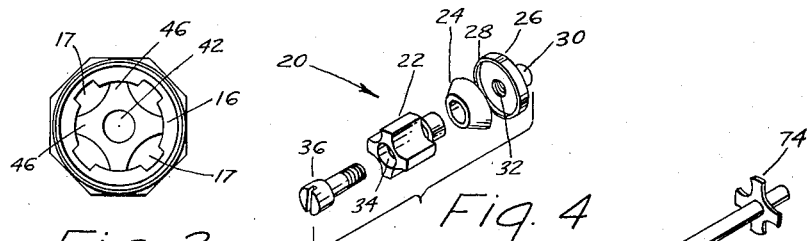
Fig. 3 is an end view thereof taken in the direction of the arrows of Figs. 1 and 2.
Fig. 4 is an exploded perspective of the valve assembly utilized in my invention.

Referring now to Fig. 4, it will be noted that valve assembly 20 comprises a metallic fluted body portion 22, a washer 24 which may be of hard rubber or any fibrous material capable of providing a tight seal when under pressure, and an end member 26. Member 26 has a peripheral wall 28 which snugly encompasses the washer 26 and further has a centrally disposed stud 30 and an internally threaded bore 32. A bore 34 extends through the body member 22 so that when said body member, washer and end member are assembled, a screw 36 may be passed therethrough and threaded into bore 32 to draw the elements together into a tightly assembled unit. The bore 34 is counterbored to receive the head of screw 36 in substantially flush relation with the edge of body member 22.

The valve assembly 20 is normally biased to a closed or shut-off position by means of a coil spring 38. A retaining element 40, having a centrally disposed aperture 42 and a hub 44 therearound and further having four radially extending arms 46 serves to maintain the spring 38 in position against the valve. This is accomplished by aligning the arms 46 with the notches 17, pushing the retainer 40 inwardly against the action of spring 38 and then rotating it slightly whereby it will be maintained by the flange 16. In this position, Fig. 1, the spring 38 is maintaining the valve in closed position. It will be noted that the spring 38 will be firmly maintained in proper position due to the fact that the opposite ends thereof surround the stud 30 and hub 44, respectively. Constricted portion 18 is chamfered slightly as at 48 to facilitate coaction with washer 24.

Figures 5, 6, 7, 8, 9:
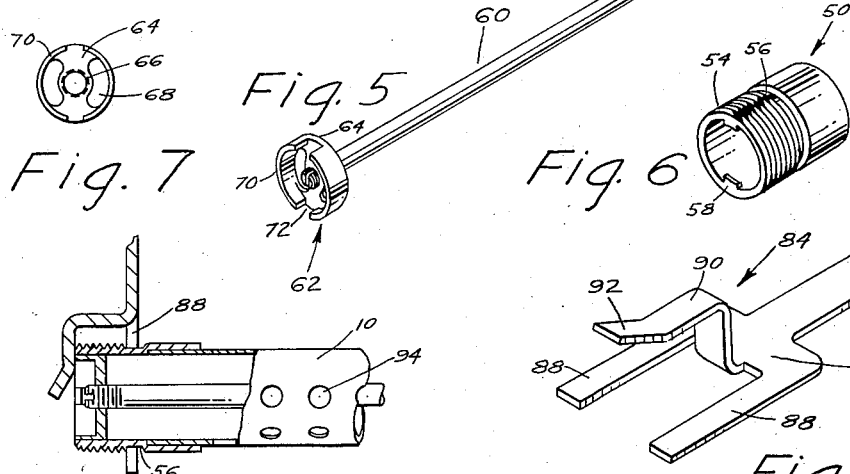
Fig. 5 is a perspective view of the rod and pusher disc assembly utilized in my invention.
Fig. 6 is a perspective of the outlet coupling utilized.
Fig. 7 is a plan view of the pusher disc.
Fig. 8 is a side elevation, partly in section, and broken away showing the valve being actuated by a specially designed spanner tool.
Fig. 9 is a perspective of the spanner tool.

The opposite end of tube 10 carries an outlet coupling, generally designated at 50 and shown in detail in Fig. 6. Coupling 50 has an internal peripheral shoulder 52

(note Figs. 1 and 2) against which the end of tube 10 abuts, it being understood that coupling 50 is secured to the tube 10 in any desirable way such as by soldering or the like. The coupling 50 is externally threaded at one end thereof, as at 54, said threads terminating in a peripheral groove 56. The threaded end of coupling 50 has two diametrically opposed inwardly extending teeth 58.

An elongated plunger rod 60 threaded at one end as at 61 is slidably carried by the coupling 50 by means of a pusher disc, generally shown at 62. Pusher disc 62 comprises a circular base 64 having a threaded aperture 66 centrally disposed therein and a pair of kidney slots 68. The base 64 further carries a peripheral wall 70 in which are formed a pair of diametrically opposed notches 72. The disc 62 is threadedly attached to the rod 60, as shown in Fig. 1 and is then mounted within coupling 50 in such a manner that the notches 72 receive the aforedescribed teeth 58. It will be understood that this is done before the coupling 50 is secured to tubing 10. The interengagement of teeth 58 and notches 72 will key disc 62 to the coupling 50 while at the same time providing guide means for relative longitudinal movement therebetween. Element 74 is a guide means carried by rod 60 to maintain the rod in proper alignment within tube 10.

In operation and use, Fig. 1 shows my valve control structure in closed or shut-off position. It will be understood that a water pipe (not shown) will be received by the threads 14 either directly or indirectly, and that the flow of water in the direction of the arrow will be interrupted because of the fact that spring 38 is biasing the valve 20 to its closed position. It will be noted that the walls 70 of disc 62 are in their outermost position and that rod 60 is exerting no thrust against the valve 20.

Figure 2:
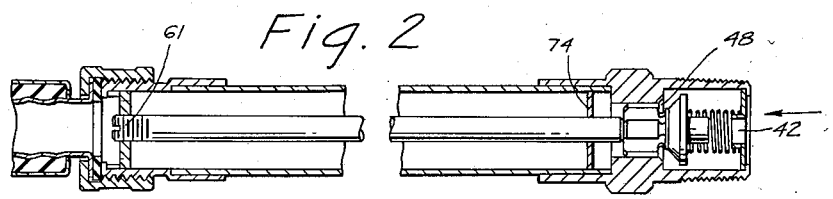
Fig. 2 shows my assembly with the valve in open position.

When a standard hose coupling 76 having internal threads 78 and a washer 80 is screwed on to coupling 50, as illustrated in Fig. 2, washer 80 will engage the walls 70 and exert an inward thrust thereupon, thereby causing disc 62 and rod 60 to move inwardly, which in turn causes valve 20 to move to open position against the action of spring 38. Thus it will be seen that virtually the last turn of coupling 76 on coupling 50 will automatically cause the valve to open and the water to commence to flow. The particular configuration of retaining element 40 and guide means 74, the fluting of body portion 20 plus the kidney slots 68 are all designed to enable the water to flow freely through tube 10 when the valve is opened.

It will be understood that instead of valve coupling 12 and outlet coupling 50, the tubing 10 could be integrally formed to provide the respective structures of these couplings. However, use of these couplings is preferred, since it enables different lengths of tubing to easily be utilized.

An important feature of my invention is the threaded connection between rod 60 and disc 62 which enables ready adjustment to vary the inward movement of the valve and hence control the flow of water. Thus a slot 82 is provided at the end of rod 60 for the reception of a screw driver or the like. For example, if a screw driver were inserted in slot 82, Fig. 1, and were turned counter-clockwise for a short distance, the disc 62 and walls 70 would be drawn inwardly thereby reducing the stroke of rod 60 against the valve 20. Once the proper adjustment is attained, disc 62 may be secured to the rod 60 by spot soldering or the like.

In Fig. 9 there is shown a spanner tool 84 which may be utilized to open the valve where it is not desired to screw on a hose coupling or the like. The tool 84 comprises a handle portion 86, spaced legs 88, a bridging portion 89, and a centrally disposed finger 90 terminating in an inclined portion 92. In use, note Fig. 8, the legs 88 are received by groove 56 of coupling 50 and as the tool is forced downwardly, the inclined portion 92 of finger 90 will cam wall 70 inwardly, thereby opening the valve. It will be understood that tool 84 is only representative of a variety of tools that could be utilized to actuate the valve 20. For example, instead of the camming action described, a leverage principle could be utilized to force the wall 70 inwardly. If desired, a plurality of apertures 94 may be provided in the tube 10, whereby when the valve is opened, water or the like will spout from a plurality of locations simultaneously. When the apertures 94 are utilized, the kidney slots 68 in pusher disc 62 are eliminated in order to build up sufficient pressure within tubing 10 to cause water or the like to spout outwardly through the apertures 94.

Figure 10:
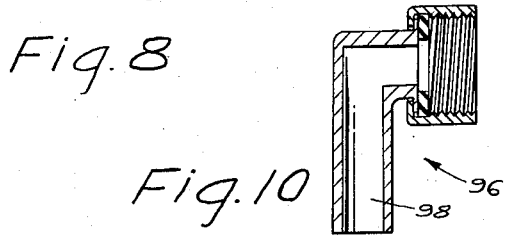
Fig. 10 is a side elevation in section of a modified hose coupling adapted to actuate the valve.

In Fig. 10 there is shown a modified form of split coupling 96 which may be utilized to actuate the valve. The working parts of this coupling are identical to those of the aforedescribed hose coupling 76 and it operates in the same manner but instead of being a hose connection, it has its own nozzle 98. This coupling would be of particular value where it is desired to fill buckets, etc.

From the foregoing it will be seen that there is provided a valve control wherein the point of actuation can be maintained considerably remote from the valve per se. The actual degree of remoteness is subject to a wide range of variation since the tubing 10 and the rod 60 can be of virtually any desired length. As a result of this, water need never remain within the tubing 10 where it might be exposed to freezing temperatures, it being understood that said tubing will be designed so that water will drain therefrom when the valve is closed. Furthermore, actuation of the valve is not dependent upon manipulation of a handle but rather occurs automatically as described.

While there is shown and described herein certain specific structure embodying the invention it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

I claim:

In a device of the character described, a length of tubing, a valve mounted in said tubing, means normally biasing said valve to closed position, a disc slidably mounted within one end of the tubing, said disc having a peripheral wall extending outside the adjacent end of the tubing, said wall having a plurality of notches therein, a plurality of inwardly extending teeth carried by said one end of the tubing, said teeth and said notches coacting to key said disc to said tubing and further to limit the outward slidable movement of said disc, an elongated rod having one end threadedly connected to said disc and its other end in alignment with and adjacent to said valve, whereby when inward pressure is applied to said peripheral wall, said other rod end engages said valve and forces it open.

References Cited in the file of this patent

UNITED STATES PATENTS

| | | |
|---|---|---|
| 628,285 | Reaume | July 4, 1899 |
| 968,711 | Stevenson | Aug. 30, 1910 |
| 1,564,618 | Petzing | Dec. 8, 1925 |
| 1,774,918 | Hall | Sept. 2, 1930 |
| 2,181,758 | Goon | Nov. 28, 1939 |
| 2,297,857 | Anagno | Oct. 6, 1942 |
| 2,688,266 | Kudsen | Sept. 7, 1954 |

FOREIGN PATENTS

| | | |
|---|---|---|
| 94,058 | Sweden | of 1939 |